United States Patent Office 2,961,245
Patented Nov. 22, 1960

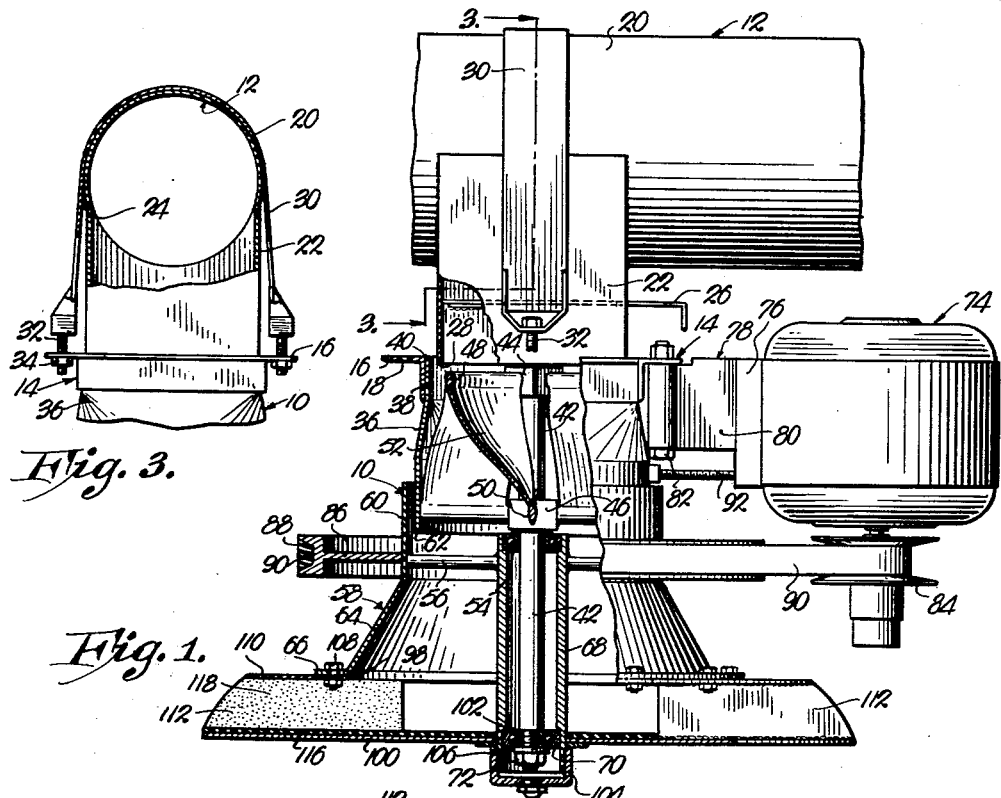

2,961,245

GRAIN SPREADING APPARATUS

Arnold L. Romeiser, 844 Russell, Salina, Kans.

Filed July 15, 1958, Ser. No. 748,632

14 Claims. (Cl. 275—15)

This invention relates to improved apparatus for distributing granular material over a relatively wide area. For purposes of illustration only, the invention will be exemplified by description of a preferred embodiment of apparatus particularly adapted for the spreading of grain, such as wheat, over the entire area of a grain storage bin or other facility. It is to be understood, however, that the invention actually has a wider scope and field of applicability both as to the variety of granular materials with which it may be employed and as to the types of material storing facilities with which it may be used, further examples of the latter including the holds of ships, open, flat storage areas such as the ground or platforms where it is desired to cover a maximum area without relocating the material distribution equipment, etc.

Although prior attempts have been made to provide apparatus for discharging and spreading granular material throughout a wide area, all of such prior attempts have resulted in apparatus which was impractical or subject to such serious disadvantages and limitations as to be commercially unsatisfactory. Among such disadvantages and limitations may be noted the limited angle of inclination of the material being spread from the vertical, resulting in a relatively restricted zone of distribution of the material even when the apparatus was disposed at a considerable height and rendering such apparatus entirely unsatisfactory for use in storage facilities having relatively low ceilings and wide expanses, the limited quantities of materials which could be continuously handled by such prior apparatus, the weight and complexity of such prior apparatus resulting not only in increased costs of production, but also in lack of portability or inconvenience in installing and moving the apparatus and susceptibility of same to the necessity for frequent repairs and adjustments.

Accordingly, the primary object of this invention is to provide improved, simplified and more reliable apparatus for the distribution of granular materials which utilizes certain novel principles of operation and structural relationships to overcome the mentioned disadvantages and limitations of prior material spreading apparatus and resulting in increased efficiency in spreading the materials over a wide area and which is adapted for substantially continuous operation during rush seasons in grain elevators or the like.

Another important object of the invention is to provide such improved material spreading apparatus in which is employed a rotating, upright, tubular drum assembly which tends to agitate and diffuse a stream of granular material flowing therethrough by virtue of the centifugal force applied to grains of material contacting the rotative side wall of the drum.

It is another important object of this invention to provide such improved spreading apparatus for granular material in which the mentioned rotating drum is utilized in conjunction with deflector means adjacent the outlet of the drum for discharging the material from the apparatus in a trajectory having a predominant horizontal component.

It is another important object of this invention to provide such improved apparatus in which the mentioned drum and deflector, material discharging means may be rotated together by a single prime mover and in which the speed of rotation may be varied to control the radius of the area over which material is to be spread.

Another important object of the invention is to provide such improved apparatus in which dust and other foreign substances normally found in granular materials such as wheat or the like, will be more or less evenly distributed throughout the discharged material, rather than accumulated in zones or pockets which may lead either to spoilage or to creation of dangerous conditions suitable for the occurrence of undue heating, spontaneous combustion or the like, as was the case with most, if not all, of the known prior types of spreading apparatus.

Still other important objects of the invention including the way in which granular material being introduced into the rotating drum is directed toward the side wall of the latter, the way in which the interconnected rotating drum and discharged deflector means are driven from a sheave externally circumscribing the rotating assembly, and certain important details of construction will be made clear or become apparent as the following description of the preferred, illustrative embodiment of the invention progresses.

In the accompanying drawing:

Fig. 1 is a side elevational view of a preferred embodiment of the invention installed upon a material conveyor tube from which it may receive material to be distributed, with parts broken away and shown in cross section for clarity of illustration;

Fig. 2 is a top plan view of the main, lower portion of the apparatus with parts broken away and shown in section for clarity of illustration; and Fig. 3 is a cross-sectional view taken on irregular line 3—3 of Fig. 1 and further illustrating the detail of the upper portion of the apparatus by which the lower portion thereof illustrated in Fig. 2, may be releasably mounted upon a material conveyor tube or the like.

Referring now to the drawing, the illustrative embodiment of apparatus for distributing granular material is generally designated by the numeral 10, while one form of equipment by which granular material to be distributed may be supplied to the apparatus 10, is generally designated by the numeral 12.

The apparatus 10 includes a main frame 14 upon which the remainder of the apparatus 10 is adapted to be mounted. Frame 14 preferably includes horizontal flange parts 16 provided with perforations 18 for receiving bolts (not shown) for mounting the same, when desired, in permanent installations. However, the apparatus 10 enjoys as one of its special advantages, its adaptability to be moved from point to point in a grain elevator or the like as the occasion may demand.

Accordingly, Figs. 1 and 2 illustrate the manner in which the apparatus 10 may be releasably suspended from equipment 12 in the nature of a horizontal material-conveying tube 20 provided with a discharge port defining chute 22 depending from the tube 20 in communication with an interruption or opening 24 in the latter and having a shiftable closure 26. As illustrated, the discharge chute 22 will normally be circular in cross section and terminate in a lowermost annular edge 28. The apparatus 10 includes an inverted U-shaped clamping strap 30 adapted to extend over the top of the material-carrying tube 20 and to be secured to the flange portion 16 of the frame 14 by means of bolts 32 and nuts 34.

Rigidly mounted upon the frame 14 of apparatus 10 is an upright, tubular, conduit 36 of generally circular, transverse cross section, although an upper portion 38 thereof may be squared as best illustrated in Fig. 3 to facilitate the securement thereof to the frame 14 by means such as welding as at 40. When the apparatus is installed upon equipment 12 having a depending discharge chute such as at 22, the nuts 34 are normally tightened upon bolts 32 to position the apparatus 10 so that the lower edge 28 of the chute 22 extends slightly into the upper portion 38 of the stationary conduit 36, it being noted that, if the upper portion 38 of the conduit 36 is squared as described, this will facilitate the reception of the lower portion of chutes 22 of square, rather than round, cross section.

A vertical shaft 42 is fixedly mounted relative to the conduit 36 and the base 14 by means of a pair of vertically spaced shaft holding blocks 44 and 46, a set of radially extending, upper spider members 48 oppositely secured to the block 44 and the conduit 36, and a set of lower, radially extending spider members 50 oppositely secured to the lower block 46 and a lower portion of the conduit 36, it being clear from Fig. 1 that the shaft 42 depends a substantial distance below the lower block 46.

In the preferred construction, there are four upper spider members 48 spaced from each other at 90 degree intervals, and four lower spider members 50 also spaced from each other at 90 degree intervals. It will be further noted, however, that the lower spider members 50 are offset from the upper spider members 48 by an angle of approximately 45 degrees, so that each of the lower spider members 50 lies in a vertical plane substantially bisecting the angle between a pair of upper spider members 48.

An arcuately contoured vane 52 extends between and interconnects each of the upper spider members 48 with a corresponding one of the lower spider members 50 that is displaced from such upper member 48 in a direction similar to that in which the drum assembly later to be described, is rotated relative to the conduit 36. It will be understood that such vanes 52 extend outwardly from adjacent the shaft 42, to a zone proximate the inner surface of the conduit 36, so that all granular material introduced into the top of the conduit 36, falls upon one or the other of the vanes 52 and is deflected by the latter in an outward and downward direction and in the same general direction as the mentioned rotation of the drum assembly to be described relative to the conduit 36.

Rotatably mounted upon the shaft 42 below the block 46 by means of spaced bearings 54 and radially extending spider members 56, is an upright, tubular drum assembly generally designated 58, having an upper cylindrical section 60 extending above the lower annular edge 62 of conduit 36 outwardly of the latter, and a lower, outwardly-flared, generally frusto-conical section 64 having an outturned flange 66 at its lower extremity.

It will be noted that the spider members 56 are actually secured at their innermost ends to a rotatable sleeve 68 carried by the bearings 54 and by lower bearings 70 spaced adjacent the lowermost extremity of the shaft 42 and secured on the latter by nut means 72. The outermost portions of the bearings 54 and 70 may be interconnected with the sleeve 68 by press-fitting or the like, to permit replacement after long continued use, and the innermost portion of the bearing 54 may similarly be press-fitted to the shaft 42 or secured thereto in any other suitable fashion.

It is important to note that the spider members 56, of which there may be four, spaced at 90 degree intervals in a preferred embodiment of the invention, serve not only to support the drum assembly 58 for rotation relative to the shaft 42 but, since such spider members 56 rotate with the drum 58, same serve as deflectors to engage streams of granular material entering the top of the drum 58 for further splitting such streams and impelling engaged portions thereof in a generally outward direction toward the inner surface of the side wall of drum 58 and in the same general direction as the drum 58 and members 56 are being rotated.

An electric motor generally designated 74, which may be rated for about one horse power and for a speed of the order of 900 revolutions per minute in a preferred embodiment, is mounted upon one leg 76 of a generally L-shaped bracket designated 78, and having a shorter leg 80 pivotally connected to the base 14 by bolt means 82 for swinging about a vertical axis.

The motor 74 is provided with a variable speed sheave 84 such as the Lewellen variable speed pulley No. 308 offered on the open market. An outwardly-extending flange 86 on the upper section 60 of drum 58 and circumscribing the same terminates in a sheave face 88 for receiving an endless belt 90 which is also trained around the variable speed sheave or pulley 84.

An adjusting screw 92 is rotatably connected with the base 14 as at 94 and is threadably coupled with the extremity of leg 76 of bracket 78 remote from leg 80 thereof as at 96, the latter connection also being pivotal. Accordingly, it will be understood that as the adjusting screw 92 is turned, the bracket 78 will be swung about its pivotal mounting 82 to cause the belt 90 to ride higher or lower within the variable speed sheave 84, thereby controlling the ratio of power transfer between the sheaves 84 and 88 and the speed of rotation of the drum 58. Typical operation of the apparatus 10 will normally involve speeds of rotation of the drum 58 of between somewhat below 100 revolutions per minute to around 400 revolutions per minute, such range of speeds, which is continuously variable, resulting in an adjustability of the radius of distribution of the granular material of from about 10 feet to around 100 feet or more, depending somewhat upon the nature of the granular material being handled.

Spaced below the open lowermost extremity 98 of the drum assembly 58, is a round plate 100 provided with a central opening 102 therein for clearing the sleeve 68. An internally threaded cap member 104 secured to the plate 100 and depending below the opening 102, serves to rigidly mount the plate 100 on the sleeve 68, which is externally threaded as at 106 for rotation of the plate 100 with the drum assembly 58.

Spaced above the plate 100 and secured to the flange 66 of drum assembly 58 by bolt means 108, is an annular disc 110. At suitable intervals, which may be 90 degrees in the preferred embodiment, there are provided upright deflector blades 112 extending uprightly between the plate 100 therebelow and the disc 110 thereabove and secured to each of the latter in any suitable fashion such as by welding as at 114.

It will now be clear that as granular material emerges in a spiraling path from the lower and outermost extremities of the drum assembly 58 through the opening 98 therein, the same will be engaged by the rotating deflector blades 112 and impelled by the latter along a trajectory of discharge which is initially substantially horizontal and generally tangent to the circle of rotation of the particular zone of the blade 112 by which the material is engaged. That portion of the material which may not be descending in spiral fashion along the side wall of the rotating drum 58, will fall upon a central zone of the plate 100 and, by virtue of the rotational movement of the latter, will be carried outwardly for discharge either by centrifugal force or the impelling action of one of the blades 112. It will thus be clear that the apparatus 10 provides for the distribution of granular material over an extremely wide area and with a high degree of uniformity of spreading, as well as a desirable degree of intermixing of any foreign substances in the granular material as the same is being distributed throughout the storage zone.

It has been found that, particularly where large radiuses of distribution are to be provided for and, accordingly, relatively high speeds of rotation of the drum assembly 58 and deflector blades 112 utilized, some minor percentage of certain types of granular materials may be cracked or otherwise damaged by the force of impact of same upon the deflecting spider members 56, the deflector blades 112, or the plate 100.

Accordingly, in the preferred embodiment of the invention, a padding layer of resilient material such as rubber, may be provided upon each of the impact surfaces in question. In the illustrated embodiment there is shown, for example, a rubber padding layer 116 upon the upper face of the plate 100 and a similar rubber padding layer 118 upon the leading face of each of the deflector blades 112. Such padding may, of course, also be provided on the deflector spider members 56, the internal surface of the side wall of the drum assembly 58, or even upon the deflector vanes 52. However, for normal radii of distribution of granular material such as wheat or the like, it has been found that such padding generally need not be used except perhaps upon the upper surface of the plate 100 and the deflector blades 112.

It will now be apparent that the apparatus 10 is well adapted for accomplishing all of the above mentioned and other advantageous objectives thereof. It will also be evident, however, that a number of minor modifications or changes could be made from the precise structure disclosed for illustrative purposes as comprising a preferred embodiment of the invention without departing from the true spirit and intention of the improvements contemplated. Accordingly, it is to be understood that this invention should be deemed limited only by the fair scope of the claims that follow.

Having thus described the invention what is claimed as new and desired to be secured by Letters Patent is:

1. In apparatus for distributing granular material over a relatively wide area: a drum assembly having side wall structure, a material receiving chamber therewithin, a material inlet opening communicating with said chamber adjacent one extremity of the assembly, and a material outlet opening communicating with said chamber adjacent the opposite extremity of the assembly; conduit means disposed for discharging material from the lower end thereof into said chamber of the assembly through said inlet opening of the latter; stationary deflecting means in said conduit means adjacent the lower end of the latter for directing material in an outwardly and downwardly inclined direction as it leaves the lower end of said conduit means and enters said chamber; means rotatably mounting said assembly; a prime mover; means operably coupling said prime mover with said assembly for rotating the latter; a plurality of material deflecting spider members extending radially across and within said chamber and rotatable with said assembly for deflecting material entering the chamber through said inlet opening toward said side wall; and deflector mechanism external to said chamber and adjacent said outlet opening for further impelling material emerging from said outlet opening in an outward direction.

2. In apparatus as set forth in claim 1, wherein said side wall is of generally circular crosssection transverse to the axis of rotation of said assembly.

3. In apparatus as set forth in claim 2, wherein said coupling means includes sheath means upon and externally circumscribing said side wall, and endless belt means operably engaged with said sheave means.

4. In apparatus as set forth in claim 2, wherein said side wall includes an outwardly flared, generally frustoconical section adjacent said opposite extremity thereof.

5. In apparatus as set forth in claim 1, wherein said coupling means includes variable speed power transmission means for changing the speed of rotation of said assembly without changing the speed of operation of said prime mover.

6. In apparatus as set forth in claim 1, wherein said assembly is tubular and upright with its open upper end presenting said inlet opening and its open lower end presenting said outlet opening, and said assembly is rotated upon an upright axis.

7. In apparatus as set forth in claim 6, wherein said side wall includes an upper, substantially cylindrical section and a lower, outwardly flared, substantially frustoconical section.

8. In apparatus as set forth in claim 7, wherein said members are within said cylindrical section.

9. In apparatus as set forth in claim 6, wherein is provided means adapted for releasably suspending said conduit means from a horizontal material transporting tube having a discharge port with the upper end of said conduit means disposed to receive material emerging from said discharge port, said prime mover and said assembly being mounted on said conduit means.

10. In apparatus as set forth in claim 1, wherein said mechanism includes a number of blades rotatable with said assembly.

11. In apparatus as set forth in claim 1, wherein said mechanism includes a generally horizontal plate spaced below said outlet opening and rotatable with said assembly.

12. In apparatus as set forth in claim 11, wherein said mechanism further includes a number of upstanding blades on said plate.

13. In apparatus as set forth in claim 12, wherein the leading faces of said blades are provided with a resilient covering thereon.

14. In apparatus for distributing granular material over a relatively wide area: a frame; a prime mover on the frame; an upright, tubular drum assembly open at its upper and lower extremities and having a side wall of generally circular transverse cross-section; means rotatably mounting said drum on the frame for rotation about an upright axis; means operably coupling said prime mover with said assembly for rotating the latter; a plurality of spider members within said assembly, extending radially across the latter and rotatable therewith for deflecting material entering the assembly through the open upper extremity thereof toward said side wall; a generally horizontal plate mounted on said assembly for rotation therewith in spaced relationship to and below the lower open end of said assembly; and a number of upstanding deflector blades mounted on said plate for rotation therewith and extending generally radially of the axis of rotation of said plate.

References Cited in the file of this patent

UNITED STATES PATENTS

| | | |
|---|---|---|
| 110,634 | Cozad | Jan. 3, 1871 |
| 145,018 | Scarborough | Nov. 25, 1873 |
| 699,004 | O'Neil | Apr. 29, 1902 |
| 1,691,683 | Townsend | Nov. 13, 1928 |
| 1,960,859 | Wright | May 29, 1934 |
| 2,302,483 | Welty | Nov. 17, 1942 |
| 2,822,097 | Lee | Feb. 4, 1958 |
| 2,859,862 | Best | Nov. 11, 1958 |
| 2,874,878 | Stokland | Feb. 24, 1959 |